United States Patent
Huke et al.

(10) Patent No.: US 11,373,485 B2
(45) Date of Patent: Jun. 28, 2022

(54) SENSOR DATA IMPROVING WAGERING ODDS

(71) Applicant: AdrenalineIP, Washington, DC (US)

(72) Inventors: Casey Alexander Huke, Washington, DC (US); John Cronin, Jericho, VT (US); Joseph Bodkin, Quincy, MA (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/083,736

(22) Filed: Oct. 29, 2020

(65) Prior Publication Data

US 2021/0248875 A1 Aug. 12, 2021

Related U.S. Application Data

(60) Provisional application No. 62/971,337, filed on Feb. 7, 2020.

(51) Int. Cl.
G07F 17/32 (2006.01)
G06Q 50/34 (2012.01)
G06N 7/00 (2006.01)
G06Q 20/38 (2012.01)

(52) U.S. Cl.
CPC ......... G07F 17/3288 (2013.01); G06N 7/005 (2013.01); G06Q 20/389 (2013.01); G06Q 50/34 (2013.01); G07F 17/323 (2013.01)

(58) Field of Classification Search
CPC ............. G07F 17/3288; G07F 17/3223; G07F 17/323; G06Q 50/34
See application file for complete search history.

(56) References Cited

U.S. PATENT DOCUMENTS

| | | | |
|---|---|---|---|
| 2002/0068633 A1* | 6/2002 | Schlaifer | G07F 17/3288 463/43 |
| 2006/0094506 A1* | 5/2006 | Tarter | G06Q 10/00 463/42 |
| 2007/0021167 A1* | 1/2007 | Ma | A63F 13/10 463/4 |
| 2007/0072679 A1* | 3/2007 | Kerns | A63F 13/65 463/42 |
| 2010/0160012 A1* | 6/2010 | Amaitis | G06Q 50/34 463/2 |
| 2012/0108323 A1 | 5/2012 | Kelly et al. | |

(Continued)

OTHER PUBLICATIONS

Notification of Transmittal of The International Search Report and The Written Opinion dated Apr. 14, 2021 in corresponding International Application No. PCT/US21/16006; 7 pages.

*Primary Examiner* — Steve Rowland
(74) *Attorney, Agent, or Firm* — Maier & Maier, PLLC (57) ABSTRACT

A system involving analytics and collecting sensor data in real time. This system allows players to predict and wager on players actions during the course of a play that has yet to occur by collecting sensor data on the players to create a historical database. Utilizing an algorithm, the wagering odds may be improved using the various sensor data collected using artificial intelligence or machine learning. The algorithm may determine the probability of the outcome of the play through player's sensor data and these probabilities of the outcome provide additional data for a wagering platform to provide improved wagering odds to its users.

11 Claims, 3 Drawing Sheets

(56) References Cited

U.S. PATENT DOCUMENTS

| | | | |
|---|---|---|---|
| 2012/0214575 A1* | 8/2012 | Amaitis | G07F 17/3293 463/25 |
| 2013/0116032 A1* | 5/2013 | Lutnick | G07F 17/3232 463/17 |
| 2013/0012324 A1 | 6/2013 | Amaitis et al. | |
| 2015/0148129 A1 | 5/2015 | Austerlade et al. | |
| 2015/0262456 A1* | 9/2015 | Shore | G07F 17/3288 463/25 |
| 2015/0375083 A1 | 12/2015 | Stelfox et al. | |
| 2017/0039811 A1* | 2/2017 | Devaraj | G07F 17/3288 |
| 2018/0190077 A1* | 7/2018 | Hall | G07F 17/3269 |
| 2019/0197836 A1* | 6/2019 | Huke | G07F 17/3223 |
| 2019/0295382 A1* | 9/2019 | Huke | G07F 17/3276 |
| 2019/0347904 A1* | 11/2019 | Shore | G06Q 20/3227 |
| 2019/0392684 A1* | 12/2019 | McDonald | G07F 17/3211 |
| 2020/0111325 A1* | 4/2020 | Lockton | G07F 17/323 |
| 2020/0126363 A1* | 4/2020 | Trepp | G07F 17/3211 |
| 2020/0234543 A1* | 7/2020 | Schwartz | G07F 17/3223 |
| 2020/0234544 A1* | 7/2020 | Joao | H04L 9/0894 |
| 2020/0294354 A1* | 9/2020 | Joao | G07F 17/3288 |

\* cited by examiner

Fig. 1 Content - High Level Diagram

Fig. 2 Base Module Object Content

Fig. 3 Wager Module Object Content

Fig. 4 Wager Adjustment Module Object Content

| Event Data | | | | | | | Sensor Data | | | |
|---|---|---|---|---|---|---|---|---|---|---|
| Team | Position | Player | Quarter | Down | To Gain | Play | Speed | Distance Traveled | Separation | Yards After Catch |
| Falcons | Wide Receiver | Julio Jones | 2nd | 3rd | 10 | Pass | 20 mph | 18 yards | 5 yards | 10 yards |
| Falcons | Wide Receiver | Julio Jones | 2nd | 3rd | 10 | Pass | 25 mph | 24 yards | 8 yards | 2 yards |
| Falcons | Wide Receiver | Julio Jones | 2nd | 3rd | 10 | Pass | 15 mph | 9 yards | 2 yards | 1 yard |
| Falcons | Wide Receiver | Julio Jones | 2nd | 3rd | 10 | Run | 12 mph | 10 yards | 1 yard | N/A |
| - | - | - | - | - | - | - | - | - | - | - |
| - | - | - | - | - | - | - | - | - | - | - |
| - | - | - | - | - | - | - | - | - | - | - |
| Falcons | Wide Receiver | Calvin Ridley | 2nd | 3rd | 10 | Pass | 15 mph | 12 yards | 3 yards | 1 yard |
| Falcons | Wide Receiver | Calvin Ridley | 2nd | 3rd | 10 | Pass | 19 mph | 21 yards | 5 yards | 6 yards |
| Falcons | Wide Receiver | Calvin Ridley | 2nd | 3rd | 10 | Pass | 24 mph | 30 yards | 6 yards | 10 yards |
| Falcons | Wide Receiver | Calvin Ridley | 2nd | 3rd | 10 | Run | 5 mph | 4 yards | 0 yards | N/A |
| - | - | - | - | - | - | - | - | - | - | - |
| - | - | - | - | - | - | - | - | - | - | - |
| - | - | - | - | - | - | - | - | - | - | - |
| Falcons | Wide Receiver | Justin Hardy | 2nd | 3rd | 10 | Pass | 15 mph | 15 yards | 4 yards | 4 yards |
| Falcons | Wide Receiver | Justin Hardy | 2nd | 3rd | 10 | Pass | 19 mph | 9 yards | 2 yards | 2 yards |
| Falcons | Wide Receiver | Justin Hardy | 2nd | 3rd | 10 | Pass | 24 mph | 5 yards | 1 yard | 0 yards |
| Falcons | Wide Receiver | Justin Hardy | 2nd | 3rd | 10 | Run | 2 mph | 1 yard | 0 yards | N/A |
| - | - | - | - | - | - | - | - | - | - | - |
| - | - | - | - | - | - | - | - | - | - | - |
| - | - | - | - | - | - | - | - | - | - | - |

Fig. 5 Historic Sensor Database Data Content

| Wager ID | Play Data |
|---|---|
| 123654 | Pass |
| 123654 | Pass |
| 123654 | Pass |
| 123654 | Run |
| - | - |
| - | - |
| - | - |
| 123655 | Run |
| 123655 | Pass |
| 123655 | Pass |
| 123655 | Pass |
| - | - |
| - | - |
| - | - |

Fig. 6 Wager Adjustment Database Data Content

| Wager Data | | | Event Data | | | |
|---|---|---|---|---|---|---|
| Wager ID | Wager | Odds | Team | Quarter | Down | To Gain |
| 123654 | Pass | -105 | Falcons | 2nd | 3rd | 10 |
| 123655 | Run | -115 | Falcons | 2nd | 3rd | 10 |
| 123656 | Over 5 yards gained | -110 | Falcons | 2nd | 3rd | 10 |
| 123657 | Under 5 yards gained | -105 | Falcons | 2nd | 3rd | 10 |
| - | - | - | - | - | - | - |
| - | - | - | - | - | - | - |
| - | - | - | - | - | - | - |

Fig. 7 Current Wagers Database Data Content

Fig. 8 Example of Wager Module Object Content

SENSOR DATA IMPROVING WAGERING ODDS

FIELD

The embodiments are generally related to improving wagering odds offered by a wagering in-play sports gaming platform.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Currently sport betting platforms provide users with wagering odds which are usually calculated using some sort of statistical analysis on the two teams of event. A current issue with this analysis is that it does not incorporate data on a player by player basis and is determined by looking at the team as whole. While this is acceptable for wagers on the event, this may cause issues when determining odds for wagers on a play by play basis and player data, especially data collected from sensors on the player, on the field, or at the event in general, can be incorporated in order to improve the wagering odds.

BRIEF DESCRIPTIONS OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Figure 1:
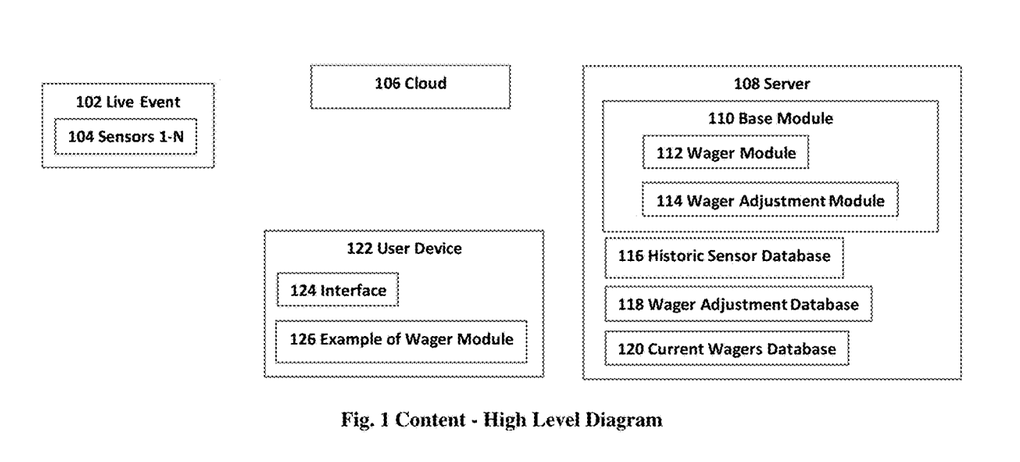
FIG. 1 illustrates a sensors improving odds system, according to an embodiment.

This is a system for a system using sensors to improve odds. This system includes of a live event 102, for example a sporting event such as a football game, basketball game, baseball game, hockey game, tennis match, golf tournament, etc. The live event will include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor's team would need to cover, if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event, such as the score of American football or the run line in baseball, or a series of action in the live event. Sportsbooks have an amount of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half time bets. Additionally, the sportsbook can offer futures bets on live events in the future. Sportsbooks need to offer payment processing services in order to cash out customers. This can be done at kiosks at the live event or at another location, at step 102. The system may include a plurality of sensors 104 that may be used such as motion sensors, temperature sensors, humidity sensors, cameras such as an RGB-D Camera which is a digital camera providing color (RGB) and depth information for every pixel in an image, microphones, radiofrequency receiver, a thermal imager, a radar device, a lidar device, an ultrasound device, a speaker, wearable devices etc. Also, the plurality of sensors may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that provides statistical information through real-time X, Y positioning of players and X, Y, Z positioning of the ball. In some embodiments, the sensor data is collected from the live event and sent to the server where it is stored in a historical sensor database. In some embodiments, the sensor data may be collected from a third party source and stored on the server, at step 104. Further, the availability of sensor data may be displayed to a user and/or any sensor data itself may be displayed to a user. Further, the availability or use of sensor data may be activated or deactivated by a user with respect to any participation in a wagering game or use in the making of wagers or adjusting of odds. The system also includes a cloud 106 or communication network may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over Internet and relies on sharing of resources to achieve coherence and economies of scale, like a public utility, while third-party clouds enable organizations to focus on their core businesses instead of expending resources on computer infrastructure and maintenance. The cloud may be communicatively coupled to server 108 which may perform real time analysis on the type of play and the result of the play. The cloud may also be synchronized with game situational data, such as the time of the game, the score, location on the field, weather conditions, and the like which may affect the choice of play utilized. For example, in other exemplary embodiments, the cloud may not receive data gathered from sensors and may, instead, receive data from an alternative data feed, such as Sports Radar. This data may be provided substantially immediately following the completion of any play and the data from this feed may be compared with a variety of team data and league data based on a variety of elements, including down, possession, score, time, team, and so forth, as described in various exemplary embodiments herein. The system may include a server 108 which may perform real time analysis on the type of play and the result of a play or action. The server 108 (or cloud 106) may also be synchronized with game situational data, such as the time of the game, the score, location on the field, weather conditions, and the like which may affect the choice of play utilized. For example, in other exemplary embodiments, server 108 may not receive data gathered from sensors and may, instead, receive data from an alternative data feed, such as Sports Radar. This data may be provided substantially immediately following the completion of any play and the data from this feed may be compared with a variety of team data and league data based on a variety of elements, including down, possession, score, time, team, and so forth, as described in various exemplary embodiments herein. The server can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can provide engaging promotions to the user. The system may include a base module 112 which initiates the wager module and then initiates the wager adjustment module and sends an updated bet database to the user device. The system may include a wager module 112 which uses the data from the historic sensor database 126 on previously collected sensor data with the same event data and performs correlations on the similar situations in order to determine if there is a correlation from the historic sensor data in order to extract and store the correlated action data in order to update the odds in the current wager database. The system may include a wager adjustment module 114 which uses the correlated action data that was extracted via the wager module and stored in the wager adjustment database and determines the averages of the correlated action data to determine the adjustment needed for the current odds stored in the current wagers database. The system may include a historic sensor database 116 which stores all the historic sensor data previously collected from a live event by the server. The system may include a wager adjustment database 118 which stores the extracted correlated action data from the wager module along with the wager ID in order to be used during the wager adjustment module to properly modify the wager odds stored in the current wagers database. The system may include a current wagers database 120 which contains the current bets that users can place a wager on. A user device 122 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wiimote for the WIT, Nintendo WII U GAMEPAD, or Apple IPHONE. Some devices allow gesture recognition inputs through combining some of the inputs and outputs. Some devices provide for facial recognition which may be utilized as an input for different purposes including authentication and other commands. Some devices provides for voice recognition and inputs, including, e.g., Microsoft KINECT, SIRI for IPHONE by Apple, Google Now or Google Voice Search.

Additional devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fibre Channel bus, or a Thunderbolt bus. The user device can leverage the sensors in for purposes such as automatic content recognition, augmented reality or the synchronization of screens between the user device interface and other displays. The interface(s) may either accept inputs from users or provide outputs to the users, or may perform both the actions. In one case, a user can interact with the interface(s) using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interface(s) may either be implemented as a Command Line Interface (CLI), a Graphical User Interface (GUI), a voice interface, or a web-based user-interface. Example wager module 126 provides correlations of data.

Figures 2, 3:
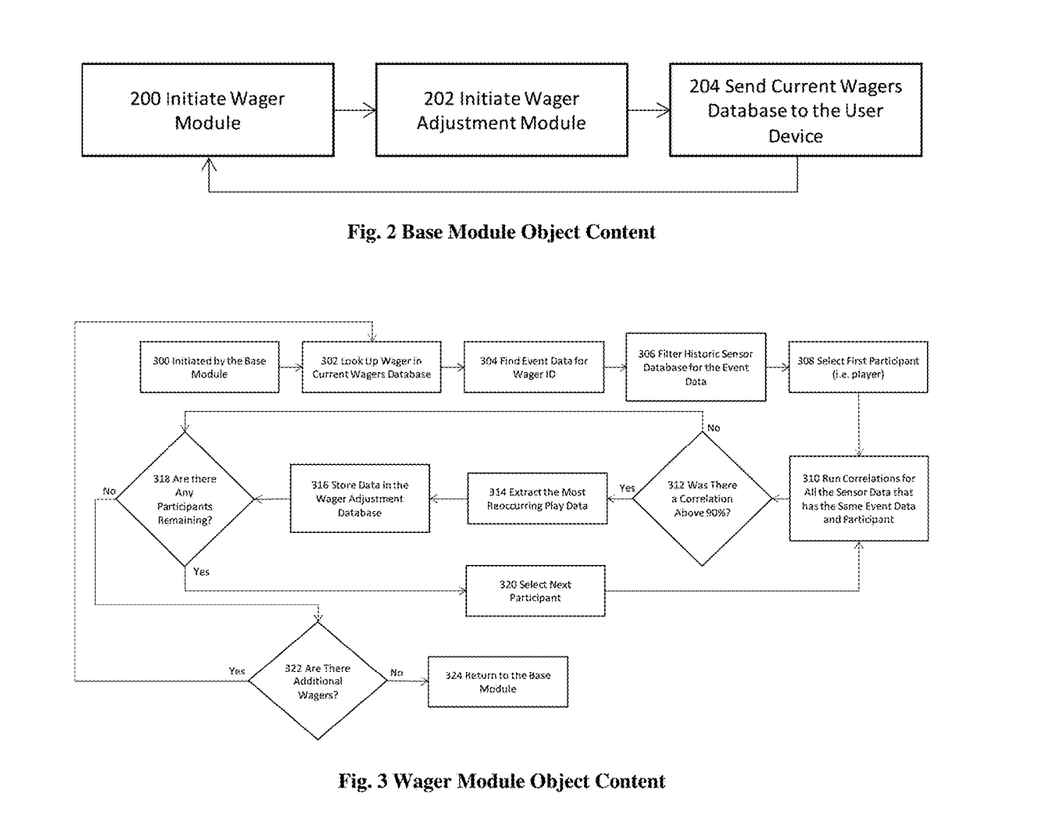
FIG. 2 illustrates a base module, according to an embodiment.
FIG. 3 illustrates a wager module, according to an embodiment.

Functioning of the base module will now be explained with reference to FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the base module. The process begins with the base module initiating the wager module, at step 200. Then the base module initiates the wager adjustment module, at step 202. Once the current wagers database has been updated via the wager module and wager adjustment module the base module sends the current wager database to the user device, at step 204.

Functioning of the wager module will now be explained with reference to FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the wager module. The process begins with the base module 110 initiating the wager module 112, at step 300. The wager module 112 looks up the wager in the current wagers database, which stores all of the available wagers that are sent to the user devices to allow customer's clients to place wagers. Wager selection information can be a "Bet" or "wager" or "buy points" or "price" or "no action" or "favorite" or "chalk" or "circled game" or "laying the points price" or "dog" or "underdog" or "money line" or "straight bet" or "straight-up" or Line" or "cover the spread" or "cover" or "tie" or "pick" or "pick-em" or "middle" or "parlay" or "round robin" or "teaser" or "prop bet" or "first-half-bet" or "half-time-bet" or "futures bet" or "future" or "Handle" or "juice" or "vigorish" or "off the board", at step 302. Then the wager module 112 finds the event data related to the wager ID. For example, the first wager ID in the current wager database is 123654, at step 304. The wager module 112 then filters the historic sensor database for the event data associated with the wager ID. For example, for the first wager ID, 123654, in the current wager database has event data that is for the Falcons team, the second quarter, third down with ten yards to gain. The historic sensor database is filtered for the team to be the Falcons, for the second quarter, for third downs with ten yards to go. It should be noted that Wager data can be a "Bet" or "wager" or "buy points" or "price" or "no action" or "favorite" or "chalk" or "circled game" or "laying the points price" or "dog" or "underdog" or "money line" or "straight bet" or "straight-up" or Line" or "cover the spread" or "cover" or "tie" or "pick" or "pick-em" or "middle" or "parlay" or "round robin" or "teaser" or "prop bet" or "first-half-bet" or "half-time-bet" or "futures bet" or "future" or "Handle" or "juice" or "vigorish" or "off the board", at step 306. Then the first participant, or player is selected which in this case would be Julio Jones. This is to continue to filter the historic sensor database 116 in order to find the data points that have similar event data, in order to find the relevant sensor data that was previously collected in similar situations within the event, at step 308. The wager module 112 then performs correlations for all of the sensor data that has the same event data as the wager ID for the selected participant, at step 310. It is then determined if there was a correlation coefficient above a predetermined threshold, such as 90%. If the correlation does not exceed the predetermined threshold the process continues to step 318, at step 312. If it is determined that the correlations exceed the predetermined threshold, for example above 90%, then the wager module extracts the reoccurring play data as well as the wager ID. For example, if there was a high correlation between the sensor data then the most reoccurring play data from the filtered historic sensor database is extracted, such as a pass or a run, at step 314. The extracted data is stored in the wager adjustment database 118, at step 316. The wager module 112 determines if there are any participants remaining, at step 318. If there are participants remaining, the next participant is selected and the process returns to step 310, at step 320. If it is determined there are no additional participants remaining, it is then determined if there are any additional wagers in the current wager database. If there are additional wagers, the process returns to step 304, at step 322. If there are no additional wagers the process returns to the Base Module, at step 324.

Figure 4:
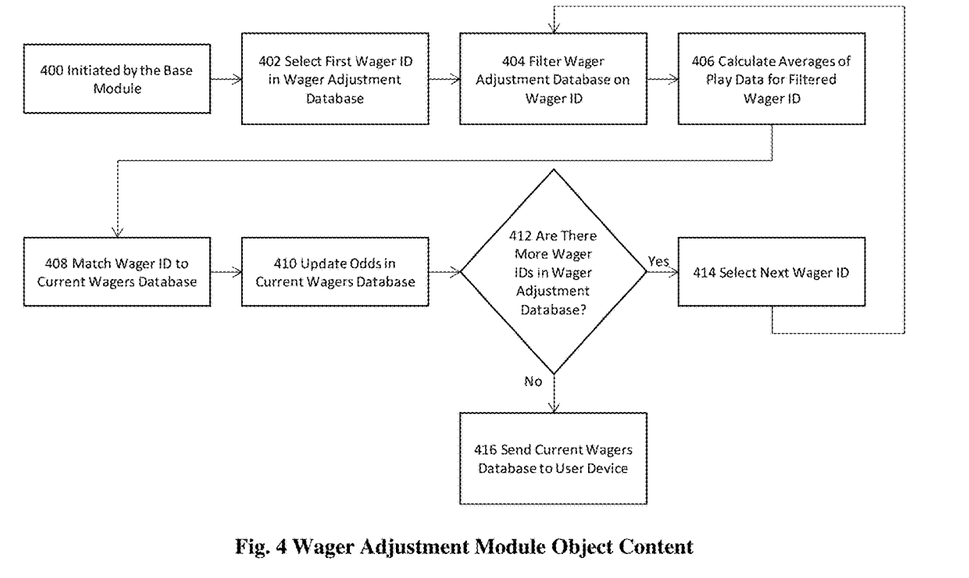
FIG. 4 illustrates a wager adjustment module, according to an embodiment.

Functioning of the wager adjustment module will now be explained with reference to FIG. 4. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the wager adjustment module. The process begins with the wager adjustment module 114 being initiated by the base module 110, at step 400. The wager adjustment module 114 selects the first wager ID in the wager adjustment database 118, which stores the wager ID as well as the most reoccurring action from the filtered data from the process described in FIG. 3, at step 402. Then the wager adjustment module 114 filters the wager adjustment database 118 on the wager ID, which leaves all the most reoccurring action or play result data that were calculated for the specific wager. Play data can be any data that indicates anything about the live game, such as, but not limited to audio of visual data that indicates "actions", "sides", "event" data, "total" data, "listed pitchers", specific players, whistles, fouls, touchdowns, goals, yardage, player error, etc., at step 404. The wager adjustment module 114 then calculates the averages of all the most reoccurring action or play results, such as a pass or a run, for the filtered wager ID. The average of the play results may be used as probabilities of the action occurring which may be used to update or improve the current odds that are stored in the current wager database 120, at step 406. Then the wager adjustment module 114 matches the wager ID from the wager adjustment database 118 to the wager ID stored in the current wagers database 120 in order to update the corresponding odds with the wager, at step 408. The wager adjustment module 114 then updates the current wagers database 120 by using the probabilities calculated in step 406 as the new odds for the wager. For example, wager ID 123654, which is a wager for a pass to occur on the next play which is 3rd and ten to go, otherwise known as a 3rd and long, is originally calculated with odds of −105. The averages calculated from the wager adjustment database show that out of four highly correlated instances three plays were passing plays and only one was a run play. So, the probability of the play being a pass would be 75%, or 33/100 which would translate to −300 and the odds for wager ID 123654 in the current wagers database 120 would be updated to −300, at step 410. It is then determined by the wager adjustment module 114 if there are any remaining wager IDs in the wager adjustment database 118, at step 412. If it is determined there are more remaining wager IDs then the next wager ID is selected and the process returns to 404, at step 414. If there is no more remaining wager IDs from the wager adjustment database 118 then the process returns to the base module 110, at step 416.

Figure 5:
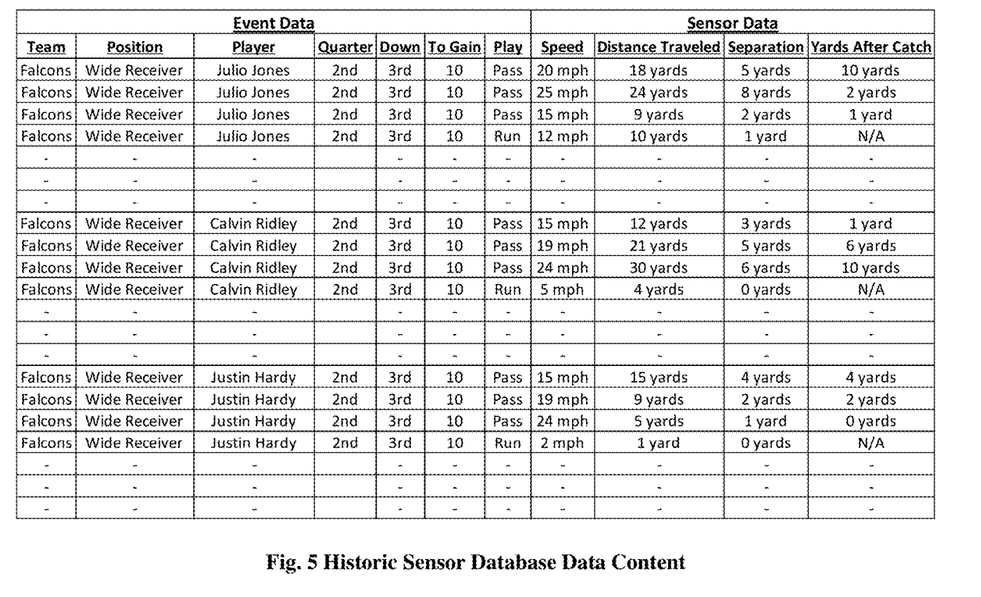
FIG. 5 illustrates a historic sensor database, according to an embodiment.

Functioning of the historic sensor database will now be explained with reference to FIG. 5. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the historic sensor database 116 which contains all the sensor data collected from participants of previous live events. The database contains event data, which is information about the event at that specific period of time in the event such as which team the sensor data was collected for, the player or participant the sensor data was collected for, what position the player plays or is aligned for the specific play, the quarter or period of time in the event the data was collected, the down and distance to go and the resulting play, for example a pass or run. The database also contains the sensor data collected during the play such as the speed of the payer, the distanced the player traveled in total, the separation and the yards after catch. The database as currently shown is filtered for the event data and the participant in order to determine if there is any correlations between the sensor data collected and the outcome of the play to determine if the odds should be adjusted in the current wagers database. In some embodiments, the sensor data collected may represent player's or participant's position on the field of play during an event, at step 500.

Figure 6:
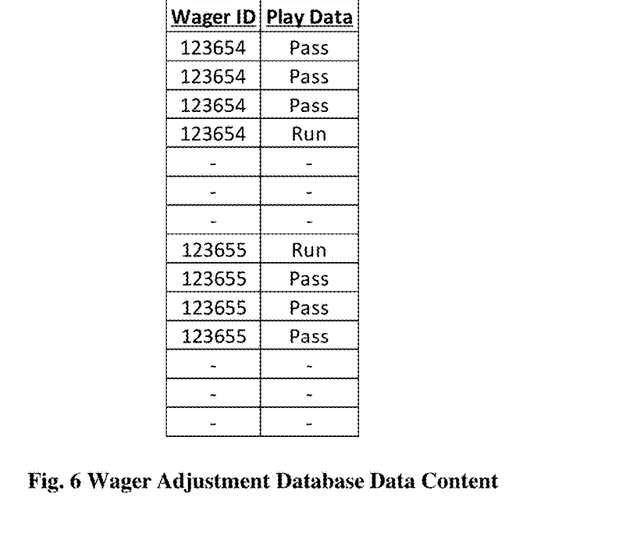
FIG. 6 illustrates a wager adjustment database, according to an embodiment.

Functioning of the wager adjustment database will now be explained with reference to FIG. 6. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the wager adjustment database 118 which stores the most re-occurring play data extracted from the wager module along with the wager ID in order to determine the probability of the upcoming play by determining the average occurrence of the play happening with similar event data and highly correlated sensor data through the process described in the wager adjustment module. The database may contain the wager ID and the play data, such as a pass or a run, at step 600.

Figure 7:
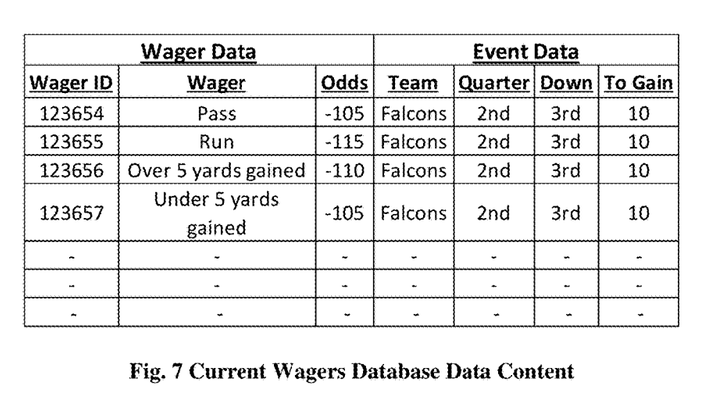
FIG. 7 illustrates a current wagers database, according to an embodiment.

Functioning of the current wagers database will now be explained with reference to FIG. 7. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The current wagers database 120 contains a list of all current wagers available to the users of the server. The database may contain wager data such as the wager ID, a description of the wager, and the wager odds. The database may contain event data related to the wager such as the team, the quarter or time period for the upcoming play, the down, and the distance to gain, at step 700.

Figure 8:
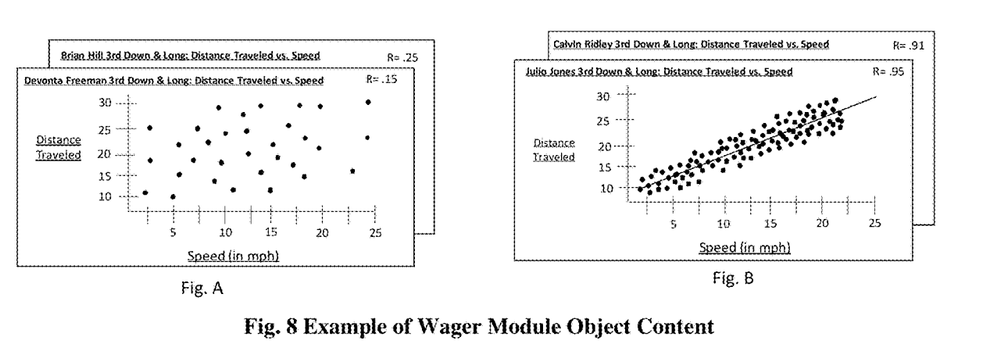
FIG. 8 illustrates an example of a wager module, according to an embodiment.

Functioning of the example of wager module will now be explained with reference to FIG. 8. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays an example of the wager module 126 and the resulting correlations. In the example for Figure A the data that is filtered by the event data and finding the various correlations with the sensor for the various participants on the field of play such as the running backs for the Atlanta Falcons Devonte Freeman, Brian Hill, etc. An example of non-correlated data with the event data and the sensor data and the running back being Devonte Freeman with a 15% (which is below the 90% threshold), therefore there is no correlation and no data should be extracted from the historic sensor database and stored in the wager adjustment database. Figure B displays an example of the correlations run in the wager module. In this example the data that is filtered by the event data from the database and finding the various correlations between the sensor data filtered on similar event data and the participants which in this example are wide receivers for the Atlanta Falcons such as, Julio Jones, Calvin Ridley, etc. The highest correlated sensor data with similar event data was the distance traveled and speed collected from Julio Jones with a 95% correlation (which is above the 90% threshold). Then the most re-occurring data action or play from the historic sensor database is extracted, for example if the correlated sensor data had a passing play three times and a running play once, the most reoccurring play would be a passing play. So that data would be extracted, along with the original wager ID from the current wagers database and stored in the wager adjustment database.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A wagering odds improvement system, comprising:
a plurality of sensors configured to capture sensor data from a live event comprising a plurality of plays, wherein the sensor data includes real-time data from tracking sensors on one or more individual players participating in one or more of the plurality of plays in the live event,
an in-play sports gaming platform, and
a user device, wherein the in-play sports gaming platform is configured to:
receive and store the captured sensor data,
filter a historical sensor database on similar event data matching a wager ID for an upcoming play, wherein the wager ID identifies individual wagers placed on upcoming plays,
determine, before occurrence of the upcoming play, that there is a high correlation between the captured sensor data and the similar event data when a correlation coefficient from the captured sensor data and the filtered data in the historical sensor database is above a predetermined threshold,
determine a probability of occurrence of the upcoming play associated with the wager ID, and
update wagering odds offered by the in-play sports gaming platform.

2. The wagering odds improvement system of claim 1, further comprising:
a wagering interface that is configured to accept wagers based on the updated wagering odds.

3. The wagering odds improvement system of claim 2, further comprising:
a wager database that is configured to store all wagers placed on the wagering interface.

4. The wagering odds improvement system of claim 1, further comprising:
an extraction of the reoccurring play and the wager ID and storage of the reoccurring play and the wager ID in a wager adjustment database.

5. The wagering odds improvement system of claim 4, further comprising:
a current wagers database that is configured to be updated with the updated wagering odds.

6. The system of claim 1, wherein the plurality of sensors capture data from at least one of a player and an object used in the live event.

7. The system of claim 1, wherein the plurality of sensors collect event data comprising informational data about action that occurred in the live event.

8. The system of claim 1, wherein the plurality of sensors are embedded in a playing surface of the live event.

9. The system of claim 1, wherein determining a probability of the occurrence of the upcoming play further comprises:
determining an average occurrence of the upcoming play happening with the similar event data and highly correlated sensor data.

10. The system of claim 1, wherein determining that there is a high correlation between the captured sensor data and the similar event data further comprises wager data associated with the wager ID being above a predetermined threshold.

11. The system of claim 1, wherein the in-play sports gaming platform is further configured to determine that the upcoming play associated with the wager ID is a reoccurring play based on the correlation coefficient being above the predetermined threshold.

* * * * *